US012794664B2

(12) United States Patent
Wright

(10) Patent No.: US 12,794,664 B2
(45) Date of Patent: Nov. 10, 2026

(54) SYSTEM AND METHOD FOR CONTROLLED GOVERNANCE OF INFERENCE AUTHORITY IN SAFETY-CRITICAL ARTIFICIAL INTELLIGENCE SYSTEMS

(71) Applicant: Joshua A Wright, Wichita, KS (US)

(72) Inventor: Joshua A Wright, Wichita, KS (US)

( * ) Notice: Subject to any disclaimer, the term of this patent is extended or adjusted under 35 U.S.C. 154(b) by 0 days.

(21) Appl. No.: 19/398,083

(22) Filed: Nov. 24, 2025

(65) Prior Publication Data

US 2026/0088970 A1 Mar. 26, 2026

Related U.S. Application Data

(63) Continuation-in-part of application No. 19/291,598, filed on Aug. 6, 2025, and a continuation-in-part of application No. 19/280,126, filed on Jul. 25, 2025.

(51) Int. Cl.
*H04L 9/00* (2022.01)
*G06F 11/20* (2006.01)

(52) U.S. Cl.
CPC .......... *H04L 9/006* (2013.01); *G06F 11/2023* (2013.01); *H04L 9/50* (2022.05); *G06F 2201/85* (2013.01)

(58) Field of Classification Search
CPC ........ H04L 9/006; H04L 9/50; G06F 11/2023; G06F 2201/85
USPC .......................................................... 713/194
See application file for complete search history.

(56) References Cited

U.S. PATENT DOCUMENTS

| | | | | |
|---|---|---|---|---|
| 4,656,603 | A | 4/1987 | Dunn | |
| 6,978,022 | B2 | 12/2005 | Okimoto et al. | |
| 8,001,422 | B1 | 8/2011 | Sun et al. | |
| 9,672,137 | B1 | 6/2017 | Allocca et al. | |
| 10,275,721 | B2 | 4/2019 | Dukatz et al. | |
| 10,764,531 | B1 | 9/2020 | Min | |
| 11,301,859 | B2 | 4/2022 | Jajara et al. | |
| 11,574,238 | B2 | 2/2023 | Saha et al. | |
| 11,593,538 | B2 | 2/2023 | Procaccioli et al. | |
| 11,644,834 | B2 | 5/2023 | Ditty et al. | |
| 11,924,343 | B2 | 3/2024 | Jenkins et al. | |
| 12,065,156 | B2 | 8/2024 | Uhlig et al. | |
| 12,135,949 | B1 * | 11/2024 | Cameron | G06F 40/40 |

(Continued)

FOREIGN PATENT DOCUMENTS

| | | | |
|---|---|---|---|
| CN | 113221134 | B | 8/2021 |
| EP | 3233633 | A2 | 10/2017 |

(Continued)

*Primary Examiner* — Amare F Tabor

(57) ABSTRACT

A hybrid artificial intelligence (AI) failover system is disclosed for safety-critical computing environments. A primary AI model and a candidate AI model are executed in parallel, with candidate outputs evaluated in shadow mode. A divergence analysis module and inference-authority gating logic govern controlled transfer of inference authority only when alignment criteria are satisfied over a validation interval. Upon detection of failure, drift, or anomaly, inference authority is reassigned during a controlled transition window to reduce output discontinuity or system instability. The system supports secure audit logging, encrypted data handling, and deployment in connected or air-gapped environments.

20 Claims, 7 Drawing Sheets

(56) References Cited

U.S. PATENT DOCUMENTS

| | | | | |
|---|---|---|---|---|
| 12,157,479 | B2 | 12/2024 | Ye et al. | |
| 12,271,851 | B2 | 4/2025 | Lu et al. | |
| 12,289,336 | B2 | 4/2025 | Engelberg et al. | |
| 12,339,886 | B1 * | 6/2025 | Jackson | G06F 16/383 |
| 2019/0056735 | A1 | 2/2019 | Koopman et al. | |
| 2020/0358792 | A1 * | 11/2020 | Bazalgette | G06N 20/00 |
| 2022/0004929 | A1 | 1/2022 | Sanketi et al. | |
| 2023/0148321 | A1 * | 5/2023 | Hall | G06F 18/217<br>706/12 |
| 2024/0386015 | A1 * | 11/2024 | Crabtree | G06F 16/9024 |
| 2025/0028842 | A1 | 1/2025 | Beveridge et al. | |
| 2025/0165853 | A1 * | 5/2025 | Mishra | G06N 20/00 |
| 2025/0190870 | A1 * | 6/2025 | Lecroart | G06N 20/00 |
| 2025/0259075 | A1 * | 8/2025 | Crabtree | G06F 16/3344 |
| 2025/0272534 | A1 * | 8/2025 | Nguyen | G06N 3/042 |
| 2025/0335779 | A1 * | 10/2025 | Paul | G06N 3/094 |
| 2025/0348707 | A1 * | 11/2025 | Myers | G06F 8/443 |
| 2025/0363542 | A1 * | 11/2025 | Sohum | G06Q 30/0201 |

FOREIGN PATENT DOCUMENTS

| | | | |
|---|---|---|---|
| EP | 3734536 | B1 | 11/2020 |
| WO | WO2024215671 | A1 | 10/2024 |

* cited by examiner

FIELD ROBOTICS
710

UTILITIES
720

INDUSTRIAL FACILITY
730

GOVERNMENT / DEFENSE
740

SYSTEM AND METHOD FOR CONTROLLED GOVERNANCE OF INFERENCE AUTHORITY IN SAFETY-CRITICAL ARTIFICIAL INTELLIGENCE SYSTEMS

CROSS-REFERENCE TO RELATED APPLICATIONS

This application is a continuation-in-part of:

1. U.S. application No. Ser. No. 19/280,126, titled *Secure Field-Data Capture and AI-Assisted Asset Management*, and
2. U.S. application No. Ser. No. 19/291,598, titled *Hybrid AI Failover System With Dynamic Training-to-Inference Reassignment and Shadow-Mode Gated Promotion.*

The contents of both are incorporated herein by reference in their entirety.

This continuation provides the bridging architecture that unifies on-device failover AI with secure field-data capture platforms and compliance-driven mobile/edge AI systems.

TECHNICAL FIELD

The invention relates to artificial intelligence systems for secure, compliance-driven, and safety-critical environments. More specifically, it concerns systems and methods integrating hybrid AI failover, shadow-mode model validation, and training-to-inference compute reassignment with secure mobile field-data capture, diagram ingestion, and structured extraction of engineering and industrial asset information.

BACKGROUND

Critical infrastructure organizations-including utilities, industrial facilities, defense installations, and data centers-depend on accurate field asset information and reliable on-device AI for extraction and structuring of engineering data. Existing approaches suffer from a series of deficiencies:

Lack of validated model promotion:
: Conventional systems deploy new or updated models without performing controlled, parallel comparison against the active production model.

No hybrid training-to-inference failover:
: Existing AI architectures do not dynamically reassign a training compute unit to inference when the primary inference unit fails or produces anomalous output.

Absence of shadow-mode validation:
: Prior systems do not execute new models in parallel ("shadow mode") to verify alignment before promotion.

Insufficient secure field-data capture:
: Current tools do not support encrypted, compliance-ready, offline workflows for capturing equipment images and engineering diagrams.

Inability to maintain reliable extraction under thermal throttling or hardware degradation in air-gapped environments:
: Field devices often operate in harsh conditions without reliable network support, causing degradation that existing systems cannot mitigate.

Lack of immutable audit trails required for compliance:
: Regulatory frameworks such as NERC-CIP, CMMC, SOC 2, and ISO 27001 require tamper-evident logs and model-provenance tracking, which legacy systems do not provide.

There remains an unmet need for a single, unified system that supports secure field-data capture and validated, resilient AI operation with comprehensive failover and compliance mechanisms.

SUMMARY OF THE INVENTION

This continuation-in-part introduces an integrated system that embeds the hybrid AI failover architecture of parent application Ser. No. 19/291,598 within the secure field-data capture platform of parent application Ser. No. 19/280,126. The resulting system sustains continuous, validated extraction of engineering diagrams, equipment images, and nameplate data while providing secure offline operation.

The system enables:

1. On-device extraction including OCR, topology recognition, and nomenclature parsing;
2. Candidate model execution in shadow mode;
3. Threshold-gated model promotion without cloud connectivity;
4. Automatic fallback to validated standby models when performance degrades;
5. Secure, compliance-ready operation with encrypted storage, signed models, hash-chained logs, and NIST/post-quantum synchronization pathways;
6. Continuous, reliable operation in thermal, hardware-degraded, or air-gapped environments.

This bridging continuation integrates field-data capture and AI failover technologies so that extraction workflows benefit from model validation, compute reassignment, and promotion gating. Likewise, the failover architecture is enhanced to operate in industries where accuracy, traceability, and immutability are essential. The detailed description of the hybrid AI failover subsystem, including the primary inference compute unit, training-to-inference reassignment controller, shadow-mode validation logic, divergence analyzer, and output-gating module, is set forth in the incorporated parent application Ser. No. 19/291,598 at paragraphs [0008]-[0018] and FIGS. 2-4 thereof. The entire hybrid failover and validation process, including shadow-mode execution, divergence comparison, threshold-gated promotion, compute-unit reassignment, and output gating, operates autonomously on the mobile field-data capture device without requiring any cloud connectivity or external network access at any stage.

DETAILED DESCRIPTION

Figure 1:
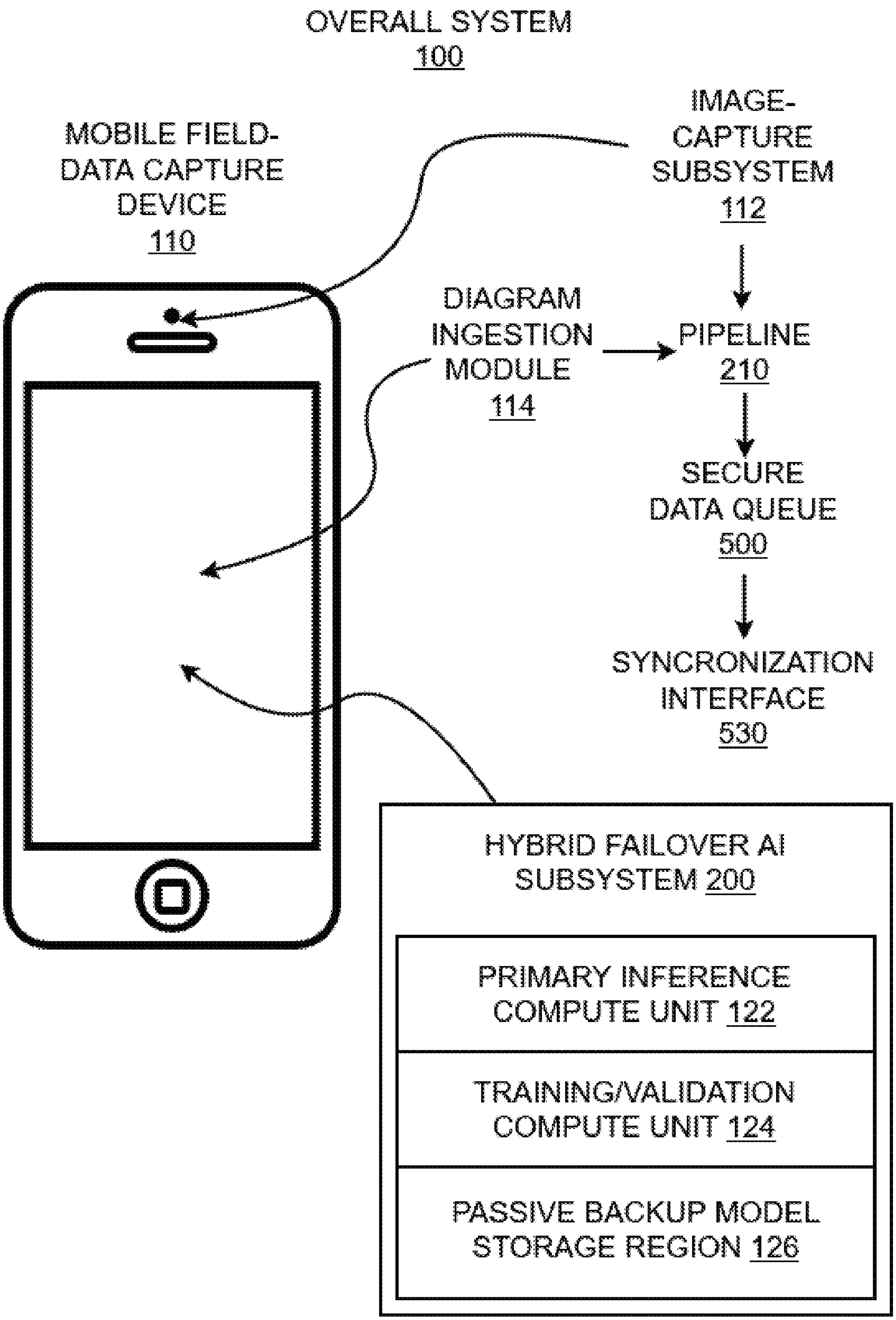
FIG. 1 illustrates a unified system architecture (100) including a mobile field-data capture device (110), an image-capture subsystem (112), a diagram-ingestion module (114), a hybrid failover AI stack (200) comprising a hybrid extraction pipeline (210) executed on a primary inference compute unit (122) and a training compute unit (124) with a passive backup storage region (126), as well as a secure data queue (500) and synchronization interface (530).

1. Unified Mobile Field Device Architecture (FIG. 1)

The system (100) includes a secure mobile or fixed field-data capture device (110) having an image-capture subsystem (112) for photographing equipment, nameplates, and diagrams, and a diagram-ingestion module (114) configured to parse one-line diagrams, engineering symbols, and structural relationships. The device further incorporates a hybrid failover AI stack (200) that includes a primary inference compute unit (122), a training compute unit (124), a passive backup storage region (126) holding validated standby models, and a hybrid extraction pipeline (210) operating across the compute units. The system additionally provides a secure data queue (500) for encrypted local storage of extracted information and a synchronization interface (530) for secure or air-gapped transmission of stored data.

The device supports full offline operation, with asset records retained locally in encrypted form until synchronization pathways are available.

Figure 2:
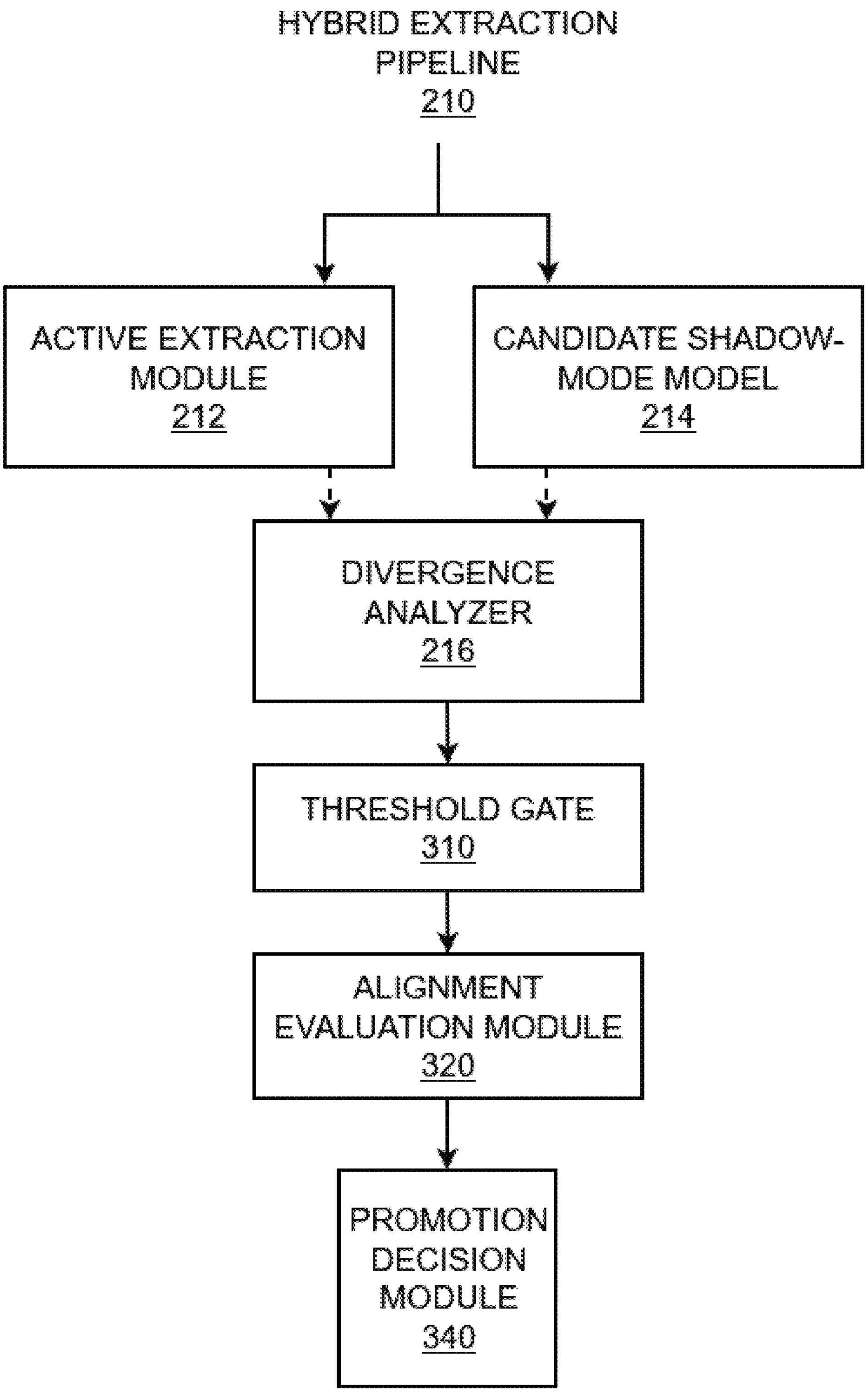
FIG. 2 illustrates a hybrid extraction pipeline (210) including an active extraction model (212), a candidate shadow-mode model (214), and a divergence analyzer (216). The figure further depicts a divergence-threshold gate (310), an alignment-evaluation module (320), and a validation-result controller (340) used to determine whether the candidate model meets promotion criteria.

2. Hybrid Failover Extraction Pipeline (FIG. 2)

The hybrid extraction pipeline (210) includes an active extraction model (212) that performs OCR, structured text parsing, topology detection, and nomenclature extraction, and a candidate shadow-mode model (214) that receives identical inputs in parallel and produces outputs analyzed by a divergence analyzer (216). Validation thresholds (310) define acceptable deviation ranges, while an alignment-evaluation module (320) further assesses consistency across extracted fields. A promotion-decision module (340) determines whether the candidate model satisfies the criteria for promotion to active inference.

Figure 3:
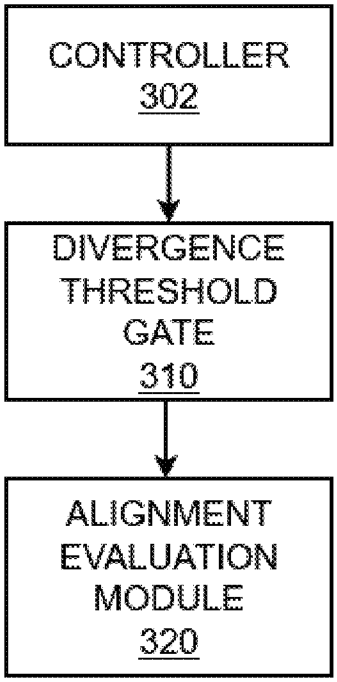
FIG. 3 illustrates shadow-mode validation logic (300) including a controller (302), a divergence-threshold gate (310), and an alignment-evaluation module (320) used to determine whether a candidate model may be safely promoted.

3. Shadow-Mode Validation Logic (FIG. 3)

The shadow-mode validation logic (300) evaluates whether a candidate extraction model should be promoted to active use. A controller (302) receives outputs from both the active extraction model and the candidate model and applies a divergence threshold gate (310) to detect unsafe deviation. When divergence remains within an acceptable range, an alignment-evaluation module (320) assesses consistency across entity boundaries, topology outputs, and structured extraction fields. This validation pathway ensures that model promotion occurs only when the candidate model demonstrates stable, safe, and predictable output behavior under identical inputs.

Figure 4:
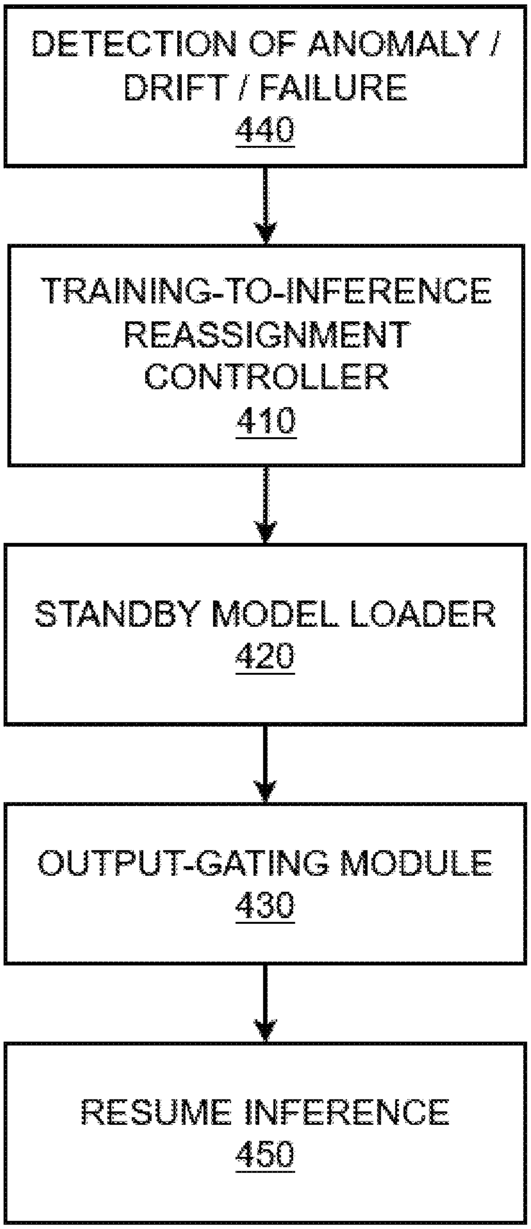
FIG. 4 illustrates a failover flow (400) beginning with anomaly detection (440), followed by a training-to-inference reassignment controller (410), a standby-model loader (420), and an output-gating module (430), after which the system resumes inference (450) using the validated standby model.

4. Failover Handling (FIG. 4)

When the active extraction model (212) fails, drifts, exceeds latency limits, produces anomalous patterns, or misinterprets engineering attributes, the system (400) initiates a failover sequence. An output-gating module (430) is first activated to close the output path, suppress unsafe outputs, and optionally route workflows to human-in-the-loop validation. A reassignment controller (410) then transitions the training compute unit (124) to inference mode, and a standby loader (420) retrieves a validated standby extraction model from the passive backup storage region (126). Once the standby model is active and stable, a resume-inference stage (450) restores normal processing, during which the output-gating module (430) re-opens to permit safe extraction output.

Figure 5:
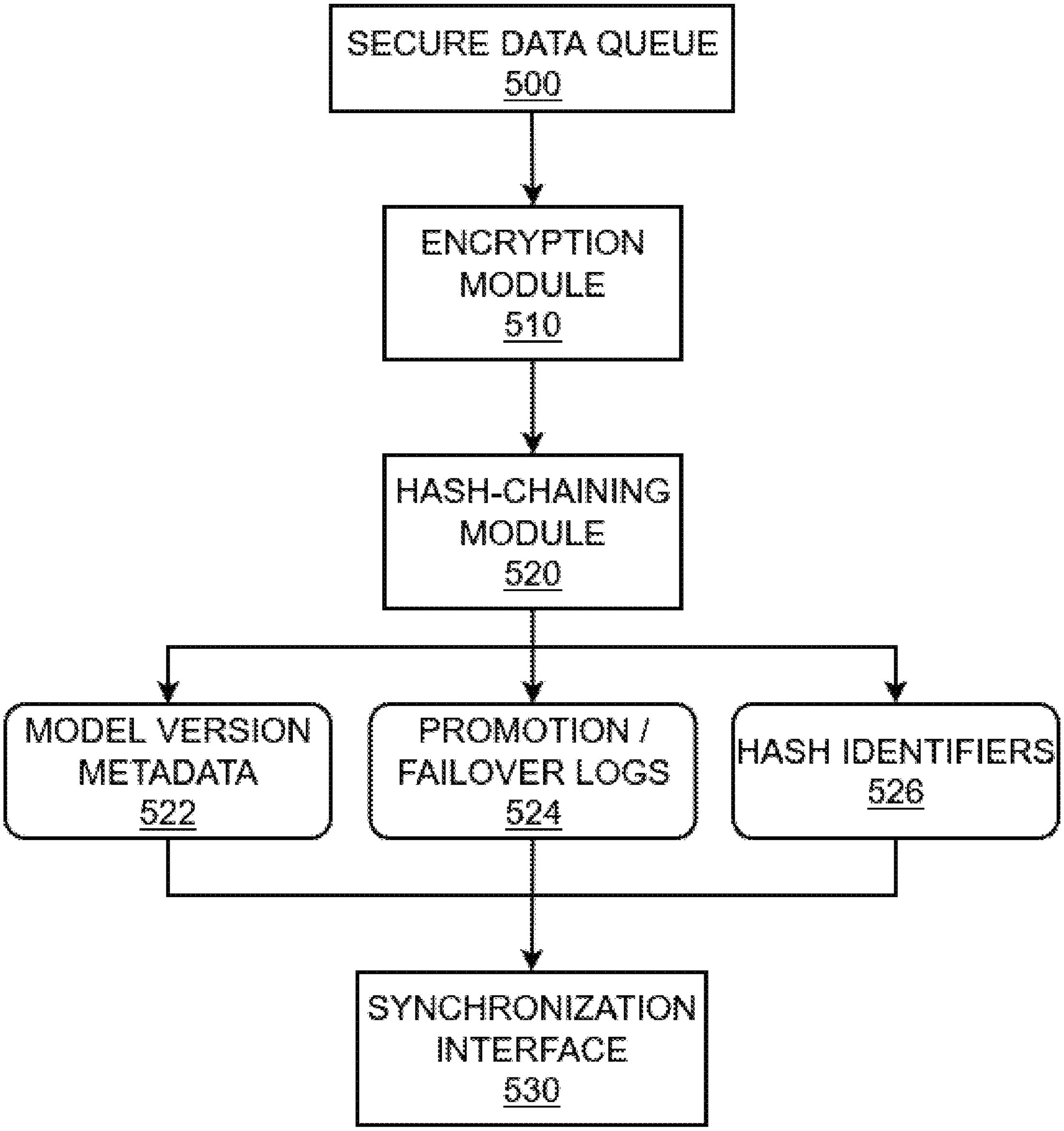
FIG. 5 illustrates a secure data-queue architecture (500) including an encryption module (510), a hash-chaining module (520), model-version metadata (522), promotion/failover logs (524), hash identifiers (526), and a synchronization interface (530).

5. Secure Data Queue and Audit Integration (FIG. 5)

All extracted data is first placed into a secure data queue (500) where it is encrypted using an encryption module (510), committed to a hash-chained structure through a hash-chaining module (520), and annotated with model-version metadata (522), promotion logs (524), and hash identifiers (526). The data remains stored locally until a synchronization interface (530) becomes available, at which point the encrypted asset records and tamper-evident logs are transmitted to a backend system using TLS 1.3 or NIST-approved post-quantum cryptographic protocols for connected deployments, or through hash-validated out-of-band mechanisms-including removable media, secure wired links, optical transfer, or near-field exchange-for air-gapped environments.

Figure 6:
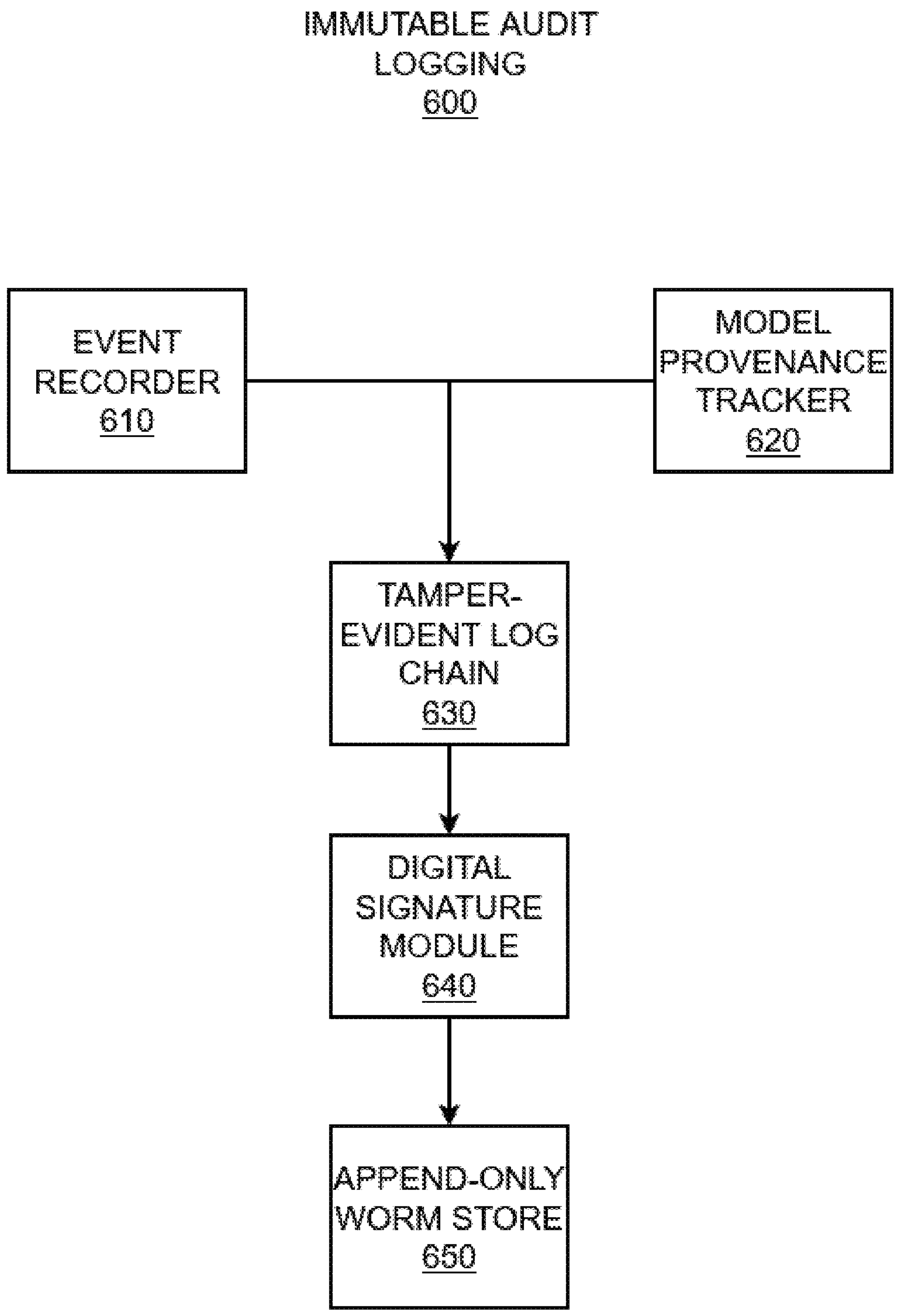
FIG. 6 illustrates an immutable/WORM audit-logging architecture (600) including an event recorder (610), a model-provenance tracker (620), a tamper-evident log chain (630), a digital-signature module (640), and an append-only WORM store (650).

6. Compliance and Audit Logging (FIG. 6)

The compliance and audit-logging architecture (600) records each operational event-including failover, model promotion, shadow-mode comparison, extraction, and synchronization-using an event recorder (610), a model-provenance tracker (620), and a tamper-evident log chain (630). These components feed a digital-signature module (640) configured to apply PKI-based signatures to each log entry before the entry is stored in an append-only WORM store (650). This audit pipeline enables compliance with regimes such as NERC-CIP, CMMC, SOC 2, ISO 27001, and IEC 62443 by ensuring that model-related and extraction-related operations are captured in an immutable, cryptographically verifiable record.

7. Deployment Examples (FIG. 7)

Figure 7:
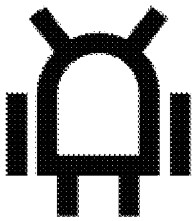
FIG. 7 illustrates deployment examples (700) including field-robotics platforms (710), utility-sector systems (720), industrial-facility environments (730), and government or defense systems (740).
Figure 7:
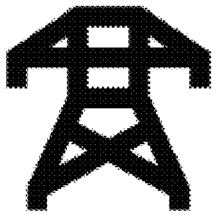
Figure 7:
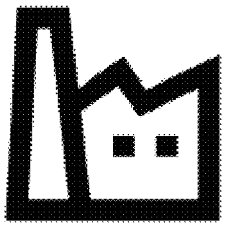
Figure 7:
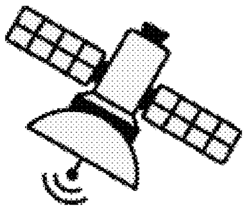

FIG. 7 illustrates non-limiting deployment examples (700) showing representative environments in which the secure field-capture architecture and hybrid failover subsystem may operate. These include (710) field-robotics platforms executing autonomous or semi-autonomous extraction tasks; (720) utility-sector assets such as substations, transmission infrastructure, or distributed-energy systems; (730) industrial-facility environments requiring compliant asset logging and on-device failover; and (740) government or defense systems incorporating secure, tamper-evident promotion and audit controls. These examples are illustrative only, and the system may be deployed in any environment requiring secure on-device extraction, local failover, shadow-mode validation, or compliance-grade audit logging.

The invention claimed is:

1. A system comprising:

a computing system configured to operate in a safety-critical environment;

a primary inference compute unit comprising at least one processor configured to execute a primary artificial intelligence (AI) model to generate inference outputs during runtime operation of the computing system;

a secondary inference compute unit comprising at least one processor configured to execute a candidate AI model in parallel with the primary AI model during runtime operation of the computing system, using inputs corresponding to a common input data stream;

one or more processors configured to govern assignment of an inference authority state associated with each of the primary AI model and the candidate AI model, including:

maintaining the primary AI model in an authoritative state in which the primary AI model is permitted to provide system output external to the computing system; and maintaining the candidate AI model in a non-authoritative state in which the candidate AI model is prohibited from providing system output external to the computing system while permitting internal generation of outputs for evaluation;

wherein the one or more processors are further configured to:

compare inference outputs generated by the primary AI model and the candidate AI model during the runtime operation; and change the inference authority state of at least one of the primary AI model or the candidate AI model based on the comparison of the inference outputs;

and wherein no system output is provided external to the computing system by any artificial intelligence model unless the model is in the authoritative state.

2. A computer-implemented method for controlling inference authority in a computing system configured to operate in a safety-critical environment, the method comprising:

executing a primary artificial intelligence (AI) model to generate inference outputs during runtime operation of the computing system;

executing a candidate AI model in parallel with the primary AI model during runtime operation of the computing system, using inputs corresponding to a common input data stream; governing, by one or more processors, assignment of an inference authority state associated with each of the primary AI model and the candidate AI model, including:

maintaining the primary AI model in an authoritative state in which the primary AI model is permitted to provide system output external to the computing system; and maintaining the candidate AI model in a non-authoritative state in which the candidate AI model is prohibited from providing system output external to the computing system while permitting internal generation of outputs for evaluation;

comparing, by the one or more processors, inference outputs generated by the primary AI model and the candidate AI model during the runtime operation;

changing, by the one or more processors, the inference authority state of at least one of the primary AI model or the candidate AI model based on the comparison of the inference outputs; and enforcing, by the one or more processors, that no system output is provided external to the computing system by any artificial intelligence model unless the artificial intelligence model is in the authoritative state.

3. The system of claim 1, wherein the parallel execution comprises shadow-mode execution in which outputs of the candidate AI model are evaluated without influencing downstream system behavior.

4. The system of claim 1, wherein the shadow-mode execution occurs during live operation without interrupting primary inference workflows.

5. The system of claim 1, wherein the change in the inference authority state is performed in a controlled manner to reduce output discontinuity or system instability.

6. The system of claim 1, wherein the comparison of inference outputs includes evaluation of at least one of semantic alignment, structural consistency, temporal stability, or confidence variance.

7. The system of claim 1, wherein the secondary inference compute unit is configured to transition from a training mode to an inference mode during runtime operation.

8. The system of claim 1, further comprising a secure data structure storing records in encrypted form and associating each record with a hash-chained entry identifying at least:

(A) a version identifier of the AI model producing the record;

(B) inference-authority transfer, promotion, or failover events; and (C) integrity metadata.

9. The system of claim 8, wherein the hash-chained entry comprises a Merkle structure, an append-only log, write-once storage, or combinations thereof.

10. The system of claim 8, further comprising one or more processors configured to transmit encrypted records and tamper-evident logs using a secure transport.

11. The system of claim 10, wherein the secure transport comprises TLS 1.3, post-quantum cryptographic protocols, or a hash-validated out-of-band transfer mechanism.

12. The system of claim 1, wherein the computing system operates under constrained latency, power, thermal, or connectivity conditions.

13. The system of claim 1, wherein inference outputs influence at least one of navigation, control, perception, situational assessment, or decision-making functions.

14. The method of claim 2, wherein inference-authority control enforces deterministic behavior consistent with functional safety requirements.

15. The method of claim 2, wherein the comparison and inference-authority transfer occur without reliance on cloud connectivity.

16. The system of claim 1, wherein inference-authority transitions are recorded in a tamper-evident audit log.

17. The system of claim 1, wherein a plurality of candidate AI models are executed in parallel, and wherein the inference authority state is assigned to one of the plurality of candidate AI models based on the comparison of inference outputs.

18. The system of claim 1, wherein, when the comparison of the inference outputs does not support a change in the inference authority state, the candidate AI model remains in the non-authoritative state.

19. The system of claim 1, wherein, when the comparison of inference outputs does not satisfy a predefined condition, inference authority remains with the primary AI model.

20. The system of claim 1, wherein the candidate AI model is maintained in a standby state and is activated for execution in response to a runtime condition.

* * * * *